Oct. 4, 1927.  
W. J. BELCHER  
POWER TRANSMISSION CHAIN  
Filed Feb. 21, 1925
1,644,656
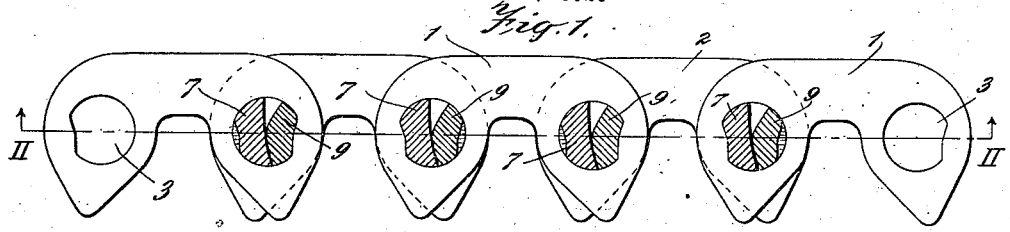
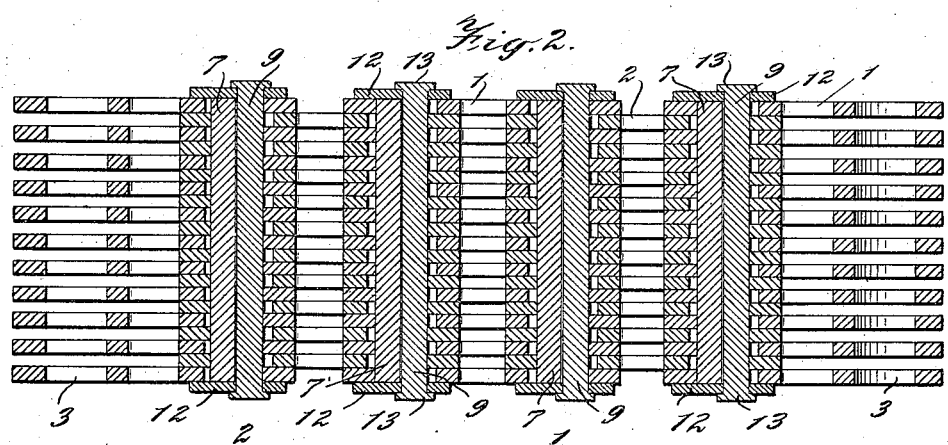
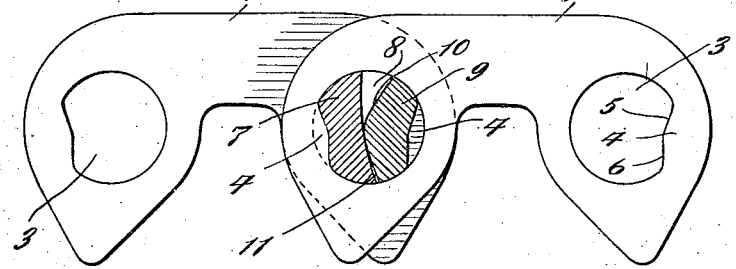
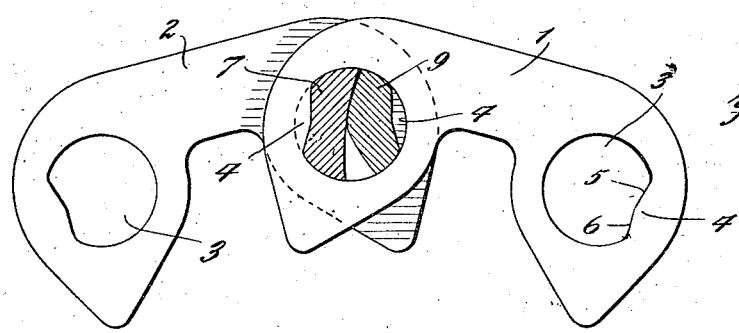
INVENTOR.  
Warren J. Belcher  
BY Gifford and Scull  
his ATTORNEYS.

Patented Oct. 4, 1927.

1,644,656

UNITED STATES PATENT OFFICE.

WARREN J. BELCHER, OF HARTFORD, CONNECTICUT, ASSIGNOR TO THE WHITNEY MFG. COMPANY, OF HARTFORD, CONNECTICUT, A CORPORATION OF CONNECTICUT.

POWER-TRANSMISSION CHAIN.

Application filed February 21, 1925. Serial No. 10,823.

My invention relates to chains of the silent link type and consists of a certain combination which renders the chain efficient, durable and noiseless in operation. Said combination will be specifically described and pointed out in the claims.

My invention will be better understood by reading the following description taken in connection with the accompanying scale drawings showing certain embodiments thereof, and in which, Fig. 1 is a side view of a portion of a chain containing my invention;

Fig. 2 is an inverted sectional view taken on the plane of line II—II of Fig. 1;

Fig. 3 is a sectional elevation on a larger scale than the preceding figures illustrating the position assumed by the links of adjacent pitches and the pin parts passing through the openings in the links in the straight run of the chain; and Fig. 4 is a view similar to Fig. 3, illustrating the position of the parts when the joint shown in Fig. 3 is flexed.

The chain shown in this application is an improvement on the chain shown in my pending application, Serial No. 726,093.

Referring to the drawings, the chain comprises a plurality of sets of links 1 arranged side by side and a plurality of links 2 arranged side by side, the links 1 and 2 being overlapped at their ends. The links 1 and 2 are of the general form common with chains of this type. Each of the links is provided with an opening 3 at each end. The openings 3 are circular with the exception of a portion 4. The portion 4 has two straight sides 5 and 6 at an angle to each other to form a projection extending into the opening.

Each joint is provided with a 2-part pintle. The parts 7 are preferably of the cross section shown in the drawings and have a concave surface 8 in one side thereof and the back portion shaped to receive the projection 4 on the links. The pintle parts 9 have a convex surface 10 on one side which cooperates with the concave surface 8 on the part 7. The back portion of the parts 9 is shaped similarly to the back portion of the parts 7 so as to fit the projections 4 in the link openings and form a socket connection.

The projections 4 in the link openings are arranged so as to give a slight angle to the pintle parts 7 and 9 when the chain is running straight, as shown in Fig. 3. This angular relation is such that there is a very slight clearance 11 between the pintle parts 7 and 9 below the center line of the chain when it is running straight, as shown in Fig. 3. This clearance is not shown in Fig. 1, but is shown in Fig. 3, which is on a larger scale than Fig. 1. The purpose of this clearance is to permit of a slight sag in the chain after it passes over the sprocket, for a reason well known in the art.

The pintle parts 9 are longer than the parts 7 and extend throughout the width of the chain and through washers 12 on the sides of the chain. These parts 9 are riveted over at their ends, as shown at 13, and act to hold the chain parts in their proper relation to each other.

In a chain of this character where sufficient clearance is provided between the edges of the pintle parts and the links it is important to provide means for preventing a relative vertical movement between the pintle parts and the links. I have accomplished this in a simple manner by providing projections 4 having the two flat angular faces 5 and 6. By reference to the drawings it will be seen that any tendency for a relative vertical movement is prevented because of the projections 4. For instance, if in the arrangement shown in Fig. 3 it was attempted to move the link 1 upwardly with respect to the link 2, the faces 5 on the link 2 would jam the pintle part 9 before any substantial movement had taken place. Obviously the projections 4 might take any other form than that shown except a straight line. The angularity of the faces 5 and 6 might be reversed and a corresponding projection placed upon the pintle parts, but I prefer the form shown in the drawings.

The projections 4 have the additional function of maintaining the pintle parts in proper relation to the links of the chain.

The cooperation of the convex and concave surfaces 8 and 10 of the pintle parts is also very desirable, for the reason that because of the relatively large area of contact between these two surfaces, the chain is much more durable than if both of the surfaces were convex. The curvature of these surfaces in the same direction provides this large area and also provides for the advantage that upon a slight wear between these two cooperating surfaces the bearing surface of each joint is greatly increased so that as the joints wear in service the area of contact between the pintle parts is greatly increased and the tendency of elongation in the chain due to wear is therefore greatly decreased. Because of this similar curvature the chain also operates quieter than if the surfaces were both convex, because of the smooth operation of one surface on the other.

Changes may be made in the details of the structure without departing from the spirit of my invention.

I claim:

1. In a silent chain, the combination of a plurality of overlapping links, having substantially circular apertures in their ends, two-part pintles for the joints, one of said parts having a convex surface and the other part having a concave surface cooperating therewith and a single eccentric portion in each link aperture forming a socket connection with pintle parts and acting to maintain the links and pintle parts in proper relation.

2. In a silent chain, the combination of a plurality of overlapping links, having substantially circular apertures in their ends, two-part pintles for the joints, one of said parts having a convex surface and the other part having a concave surface cooperating therewith and an eccentric portion with intersecting flat sides forming a socket connection with the pintle parts in the line of pull of the chain.

3. In a silent chain, the combination of a plurality of overlapping links, having substantially circular apertures in their ends, two-part pintles for the joints, one of said parts having a convex surface and the other part having a concave surface cooperating therewith and a single eccentric portion with intersecting flat sides forming a socket connection with the pintle parts and acting to maintain the links and pintle parts in proper relation.

4. In a link chain, the combination of a plurality of sets of links having overlapping ends, partly circular apertures in the ends of each link, two-part pintles passing through said apertures at each joint, said pintle parts having coacting surfaces, one of which is convex and the other concave on a greater radius than the convex surface, said pintle parts also having rear surfaces shaped to fit the non-circular portion of said apertures to prevent vertical movement of the pintle parts relative to the links.

WARREN J. BELCHER.